(12) United States Patent
Berdahl et al.

(10) Patent No.: US 7,550,162 B2
(45) Date of Patent: Jun. 23, 2009

(54) LABIATAE HERB EXTRACTS AND HOP EXTRACTS FOR EXTENDING THE COLOR LIFE AND INHIBITING THE GROWTH OF MICROORGANISMS IN FRESH MEAT, FISH AND POULTRY

(75) Inventors: Donald R. Berdahl, Lawton, MI (US); Gregory S. Reynhout, Kalamazoo, MI (US); Mark H. Schulze, Kalamazoo, MI (US)

(73) Assignee: Kalsec Incorporated, Kalamazoo, MI (US)

( * ) Notice: Subject to any disclaimer, the term of this patent is extended or adjusted under 35 U.S.C. 154(b) by 130 days.

(21) Appl. No.: 10/469,366

(22) PCT Filed: Jul. 13, 2001

(86) PCT No.: PCT/US01/22532

§ 371 (c)(1),
(2), (4) Date: Feb. 13, 2004

(87) PCT Pub. No.: WO02/069741

PCT Pub. Date: Sep. 12, 2002

(65) Prior Publication Data

US 2004/0131709 A1 Jul. 8, 2004

Related U.S. Application Data

(60) Provisional application No. 60/273,185, filed on Mar. 2, 2001.

(51) Int. Cl.
*A61K 36/53* (2006.01)
(52) U.S. Cl. .................................................... 424/745
(58) Field of Classification Search .................. None
See application file for complete search history.

(56) References Cited

U.S. PATENT DOCUMENTS

| | | |
|---|---|---|
| 2,147,261 A | 2/1939 | Lewis |
| 2,788,278 A | 4/1957 | Zimont et al. |
| 2,902,369 A | 9/1959 | Komarik |
| 3,497,362 A | 2/1970 | Patron et al. |
| 3,814,821 A | 6/1974 | Oliver et al. |
| 3,911,146 A | 10/1975 | Hara et al. |
| 3,932,603 A * | 1/1976 | Haas .................... 424/49 |
| 3,950,266 A | 4/1976 | Chang et al. |
| 4,012,531 A | 3/1977 | Viani |
| 4,056,639 A | 11/1977 | Schwarz |
| 4,343,823 A | 8/1982 | Todd et al. |
| 4,352,746 A | 10/1982 | Bracco et al. |
| 4,363,823 A | 12/1982 | Kimura et al. |
| 4,380,506 A * | 4/1983 | Kimura et al. ........... 252/398 |
| 4,450,097 A | 5/1984 | Nakatani et al. |
| 4,683,139 A * | 7/1987 | Cheng .................... 426/265 |
| 4,877,635 A | 10/1989 | Todd |
| 4,927,651 A | 5/1990 | Kumani |
| 5,017,397 A | 5/1991 | Nguyen et al. |
| 5,023,017 A | 6/1991 | Todd, Jr. |
| 5,061,403 A | 10/1991 | Todd, Jr. |
| 5,103,618 A | 4/1992 | Garwood |
| 5,209,870 A | 5/1993 | Todd, Jr. |
| 5,213,833 A | 5/1993 | Yamada et al. |
| 5,230,915 A | 7/1993 | Shahidi et al. |
| 5,286,506 A * | 2/1994 | Millis et al. .................. 426/335 |
| 5,338,838 A | 8/1994 | Hagiwara et al. |
| 5,370,863 A | 12/1994 | Barney et al. |
| 5,415,883 A | 5/1995 | Leu |
| 5,455,038 A * | 10/1995 | Barney et al. ............... 424/405 |
| 5,498,432 A | 3/1996 | Leu |
| 5,540,942 A | 7/1996 | Tokoro |
| 5,641,517 A | 6/1997 | Eskeland et al. |
| 5,667,827 A | 9/1997 | Breen et al. |
| 5,811,142 A | 9/1998 | DelDuca et al. |
| 5,948,457 A | 9/1999 | DelDuca et al. |
| 5,955,126 A | 9/1999 | Jon et al. |
| 5,989,610 A | 11/1999 | Ruzek |
| 6,099,879 A * | 8/2000 | Todd, Jr. ................... 426/240 |
| 6,129,907 A * | 10/2000 | Sreenivasan et al. .......... 424/49 |
| 6,132,781 A | 10/2000 | Carr et al. |
| 6,183,790 B1 | 2/2001 | DelDuca et al. |
| 6,190,674 B1 | 2/2001 | Beerse et al. |
| 6,666,988 B2 | 12/2003 | DelDuca et al. |
| 6,926,846 B1 | 8/2005 | DelDuca et al. |
| 7,037,543 B2 | 5/2006 | Sandusky et al. |
| 2004/0175480 A1 | 9/2004 | Seman et al. |

FOREIGN PATENT DOCUMENTS

DE 23 08 412 8/1974

(Continued)

OTHER PUBLICATIONS

Antibacterial action of hop resin materials, by W.J. Simpson et al, EBC Congress, 1991, Chapter 21, pp. 185-192.

(Continued)

*Primary Examiner*—Christopher R Tate
*Assistant Examiner*—Melenie McCormick
(74) *Attorney, Agent, or Firm*—Hueschen and Sage

(57) ABSTRACT

Compositions comprising a Labiatae herb extract and a hop extract containing beta acids and methods of using them to extend the color life and retard the growth of microorganisms in fresh meat, fish and poultry stored in an atmosphere that contains 20% or more oxygen.

26 Claims, No Drawings

FOREIGN PATENT DOCUMENTS

| | | |
|---|---|---|
| EP | 1 023 889 | 8/2000 |
| EP | 1 023 889 B1 | 8/2000 |
| GB | 2 330 076 | 4/1999 |
| GB | 2330076 A * | 4/1999 |
| JP | 05015356 | 1/1993 |
| JP | 05 268870 | 10/1993 |
| JP | 11-221064 | 8/1999 |
| JP | 2000-128801 | 5/2000 |
| RU | 2000303 C | 9/1993 |
| WO | WO 00/52212 | 8/2000 |
| WO | WO 01/15680 | 3/2001 |

OTHER PUBLICATIONS

Antimicrobial activity of hop extracts against *Listeria monocytogenes* in media and in food, by A.E. Larson et al, Int. J. Food Microbiol., vol. 33, (1996), pp. 195-207.

Antimicrobial Activity of Hop Resins, by G.J. Haas et al, J. Food Protect., vol. 57, (1994), pp. 59-61.

Antimocrobial Effect of Rosemary Extracts, by J.D. Campo et al, J. Food Protect., vol. 63, (2000), pp. 1359-1368.

Bacteriostatic Activities of Hop Resin Materials, by J.S. Hough et al, Brew. Ind. Res. Found., vol. 63, (1957), pp. 331-333.

Factors affecting antibacterial activity of hop compounds and their derivatives, by W.J. Simpson et al, J. Appl. Bacteriol., vol. 72, (1992), pp. 327-334.

Food-borne pathogens, health and role of dietary phytochemicals, by K. Shetty et al, Asia Pacific J. Clin. Nutr., (1998; 7(3,4)), pp. 270-276.

Influence of Vitamin E, Duralox®, and Herbalox® on Lean Color and Retail Case-Life of Ground Beef, by A.E. Down et al, published in Oct. 1999, pp. 19-23 http://www.ansi.okstate.edu/research/1999rr/05.htm.

Membrane Leakage in *Bacillus subtilis 168* Induced by the Hop Constituents Lupulone, Humulone, Isohumulone, and Humulinic Acid, by M. Teuber et al, Arch. Mikrobiol., vol. 94, (1973), pp. 159-171.

On the Relation Between the Staining Properties of Bacteria and Their Reaction Toward Hop Antiseptic, by J.L. Shimwell, J. Inst. Brew, vol. 43, (1937), pp. 191-195.

Phyto-phenols, by P.M. Davidson et al, Natural Food Antimicrobial Systems, A.S. Naidu, ed., 2000, CRC Press, Boca Raton, pp. 265-294.

W Manu-Tawiah, L.L. Ammann, J.G. Sebranek and R.A. Molins, 1991. "Extending the Color Stability and Shelf Life of Fresh Meat," Food Technology 45(3), 94-102.

C. Faustman, W.K.M. Chan, M.P. Lynch and S.T. Joo, 1996, "Strategies for Increasing Oxidative Stability of (Fresh) Meat Color", Reciprocal Meat Conference Proc. 49:73-79.

S.D. Shivas, H.H. Kropf, M.C. Hunt, M.C. Kastner, L.L.A. Kendall and D.A. Dayton, 1984. "Effect of Ascorbic Acid on Display Life of Ground Beef",J. Food Protect. 47:11-15, 19.

B.E. Greene, I.-M. Hsin and M.W. Zipser 1971, "Retardation of Oxidative Color Changes in Raw Ground Beef" J. Food Sci. 36:940-942.

T. Okayama 1987, "Effect of Modified Gas Atmosphere Packaging After Dip Treatment on Myoglobin and Lipid Oxidation of Beef Steaks" Meat Sci. 19:179-185.

Allen, P., Doherty, A.M., Buckley, D.J., Kerry, J., O'Grady, M.N., Monahan, F.J. 1996,42.sup.nd In. Cong. Meat Sci. Technol., 88-89.

Sante, V., Renerre, M., Lacourt, A., J. Food Qual. 17: 177-195, 1994.

J.H. Hotchkiss et al, "Advances in and Aspects of Modified Atmosphere Packaging in Fresh Red Meats", Reciprocal Meat Conf. Proc. 42 (1989), pp. 31-40.

Souzan Saad Latif Abd. El-Allm et al, "Culinary herbs inhibit lipid oxidation in raw and cooked minced meat patties during storage" J Sci Food Agric (1999), 79:277-285.

F. Timmermann, "Effectiveness of Natural Antioxidants in Salami-type Sausages", Oils-Fats-Lipids (1975), vol. 2, pp. 351-353.

Löliger, "Natural Antioxidants" In: Rancidity in Foods, Elsevier Science Pub. Co., London, 1983, pp. 89-107.

Stoick, et al. Journal of Food Science, 1991, 56:597-600.

Barbut, et al. Jounal of Food Science, 1985, 50:1356-1359.

Topfer, Chemical Marketing Reporter, 1992, p. 5.

Floreno, Chemical Marketing Reporter, 1995, p. 23.

Naturex, "Oxy'Less Clear: Effect on Ground Pork Meat", Sep. 10, 1997.

Naturex, "Oxy'Less Clear: Effect on Pork Chops", Sep. 10, 1997.

Naturex, "Oxy'Less Clear", Sep. 15, 1997.

Burke, et al. Food Science and Technology Research Conference: Abstracts, Irish Journal of Agriculture and Food Res., 1997,36:285. (abstract).

Lee, et al. Poultry Science, 1997, 76:415-421.

O'Grady, et al. Meat Science, 1998, 50:73-80.

O'Grady, et al. Irish Journal of Agricultural and Food Research 36:284 (abstract), 1997.

Kalsec, "Herbalox® Seasoning R-10:The Natural Way to Protect Flavor and Color", Jun. 1991.

Kalsec, "Herbalox® Seasoning R-20:Meat and Poultry Applications Update", Oct. 1990.

Kalsec, Herbalox® Seasoning Type WM, Sep. 1993.

Kalsec, Herbalox® Seasoning Type O, Sep. 1993.

Kalsec, Herbalox® Seasoning Type W, Sep. 1993.

Kalsec, Herbalox® Seasoning Type 25, Sep. 1993.

Kalsec, Herbalox® Seasoning Type D-20, Sep. 1993.

Kalsec, Herbalox® Seasoning Type P, Sep. 1993.

Buys, et al. Meat Science, 2000, 55:403-411. (abstract).

McCarthy, et al. Meat Science, 2001, 58:45-52. (abstract).

Sahoo, et al. Meat Science, 1997 47:223-230. (abstract).

International Preliminary Examination Report for PCT/US01/16244; Apr. 10, 2003; four (4) pages.

International Search Report for PCT/US01/16244; Nov. 15, 2001; four (4) pages.

* cited by examiner

LABIATAE HERB EXTRACTS AND HOP EXTRACTS FOR EXTENDING THE COLOR LIFE AND INHIBITING THE GROWTH OF MICROORGANISMS IN FRESH MEAT, FISH AND POULTRY

CROSS-REFERENCE TO RELATED APPLICATIONS

This application is claiming the benefit of priority under Title 35, United States Code §119(e) of the U.S. Provisional Application Ser. No. 60/273,185, filed Mar. 2, 2001.

FIELD OF THE INVENTION

This invention relates to compositions and methods for extending the shelf life of fresh meat, fish and poultry.

BACKGROUND OF THE INVENTION

Meat manufacturers are looking for ways to enable them to supply retail outlets from efficient, cost effective, central-processing centers. Increased shelf life with regard to both color (consumer acceptance) and spoilage (consumer safety) is required to make this possible as meat makes its way through longer distribution channels from producer to retailer to consumer.

Color shelf life is important to consumer acceptance. Consumers judge the freshness of meat by the presence of bright red oxymyoglobin pigment. Oxymyoglobin in fresh meat decreases with time during storage as it changes to the stable brown pigment, metmyoglobin. Although oxymyoglobin pigment fades during dark storage, for example in a meat locker, pigment loss is most pronounced in lighted, refrigerated display cases in retail establishments. Although pigment loss is primarily cosmetic in nature, it has serious economic consequences. Consumers in search of the freshest looking cuts avoid purchasing meat containing even small amounts of brown metmyoglobin. The unsaleable product which results from oxymyoglobin loss in red meats costs the industry an estimated $700 million dollars annually.

Shelf life associated with microbial spoilage is a more serious issue. The potential liability associated with food born illness outbreaks from the sale of microbially contaminated meat is enormous. The meat industry and associated retail outlets are seeking ways to insure consumer safety by preventing microbial contamination all along the manufacturing process. Process improvements such as carcass washing and carefully controlled low temperature processing are now routine in the industry. Modified atmosphere packaging (MAP) of meat products has also improved microbial shelf life of fresh meat products. Some processors have begun treating meat with ionizing radiation to extend the microbial shelf life of meat products. The irradiation process is an effective method for controlling microorganisms on meat, but many consumers are wary of its use. There is a need in the industry for antimicrobial methods and processes which are perceived by consumers as being more natural. The invention described below addresses this demand using GRAS (generally regarded as safe) seasonings.

Centrally processed meat will encounter at least two distinct storage environments prior to sale to a consumer. It will be stored in the dark at approximately 4° C. soon after production and during distribution. Prior to sale, it is likely to be stored in a refrigerated, illuminated display case. The general problem of enhancing the shelf life of fresh meat, then, can be separated into three subcategories: preserving the color during dark storage, preserving the color during storage in the lighted display case, and preventing the growth of spoilage organisms and pathogens throughout the commercially desirable storage period. We have discovered that treating meat with a combination of Labiatae herb extracts and hop extracts containing beta acids provides a novel method for enhancing the color shelf life under both dark and light storage conditions and for suppressing the growth of microorganisms for a commercially desirable period. The Labiatae herb extracts have been found to round out and suppress the bitter flavor of the hop extracts and allow for surprisingly high and truly effective concentrations of hop extracts to be added to meat without a negative flavor impact. The composition of this invention, a combination of hop extracts, Labiatae herb extracts and a storage atmosphere containing oxygen has been found to inhibit the growth of Gram positive microorganisms and very surprisingly, even Gram negative microorganisms. Prior art teaches that hop extracts do not control Gram-negative organisms. The hop and rosemary extracts are synergistic in their effects.

The antimicrobial activity of hop extracts and compounds against Gram-positive bacteria has been known for a long time. Hop extracts have not been considered effective against Gram-negative organisms. The antimicrobial activity of hop compounds has been studied mostly in growth media. Minimum inhibitory concentrations (MIC) have been determined in these media. For beta acids, the MIC is around 1 ppm. When tested in food, however, the MIC levels rise dramatically. The primary influences on MIC being fat content (the higher the fat content, the less antimicrobially active the hop acid). Another factor is pH (the lower the pH, the more active the hop acid). MICs for skim and 2% milk have been reported at 100 ppm. This rises to 1000 ppm in whole milk. The Millis et al patent teaches that beta acid flavor is noticeable at 15 ppm and becomes objectionable at 50 ppm. When hop acids are used at higher levels, the bitter flavor imparted to the food becomes a significant limiting problem. The main prior art is summarized below:

M. Teuber and A. F. Schmalreck (Arch. Mikrobiol. 94 (1973) pp. 159-171) review the use of hop extracts in medicine and reiterate that gram-negative microorganisms are generally not affected by hop extracts. Minimum inhibitory concentrations effective for Gram-positive organisms were determined for:

| | |
|---|---|
| Lupulone (beta acids) | 1 g/ml (1 ppm) |
| humulone | 2 g/ml (2 ppm) |
| isohumulone | 25 g/ml (25 ppm) |
| humulinic acid | 250 g/ml (250 ppm) |

W. J. Simpson and J. R. M. Hammond, (Antibacterial Action of Hop Resin Materials, EBC Congress, 1991, Chapter 21, pp. 185-192) describe the mode of action of trans-isohumulone (an isoalpha acid) and colupulone (a beta acid) against beer spoilage organisms. They indicate that low pH favors the antibacterial activity of isohumulone. The relative activity dropping from 226 at pH 3.8 to 42 at pH 4.6. They also demonstrate that colupulone has an effect on intracellular pH of recombinant lactic acid bacteria containing lux genes from the marine organism *Vibrio fischeri*. By implication, colupulone had antibacterial activity against this Gram-positive lactobacillus.

A. E. Larson, et al. (Antimicrobial Activity of Hop Extracts Against *Listeria* monocytogenes in Media and in Food, Int. J. Food Microbiol. 33 (1996) pp. 195-207) describe the effect of hop extracts containing varying amounts of humulones (alpha acids) and lupulones (beta acids) on controlling *Listeria*, a Gram-positive microorganism, in media and in certain foods. A hop extract (II) consisting of 41% beta acids, 12% alpha acids, and the remainder a mixture of desoxy-alpha acids, hop oils and hop waxes was found to be inhibitory at a concentration of 0.1 mg/ml (100 ppm) in skim and 2% milk and 1 mg/ml (1000 ppm) in whole milk and was listericidal in low fat cottage cheese at a concentration of between, 100 and 3000 ppm. A hop extract (III) consisting of 29.7% colupulone, 65% lupulone plus adlupulone, 8% desoxy-alpha acids, 7% water and 0.6% isoalpha acids enhanced the rate of inactivation of *Listeria* in coleslaw at a concentration of 1 mg/g (1000 ppm). Extract (III) showed no inhibitory effect even at 10,000 ppm in full fat camembert cheese. Both extracts (II) and (III) were inhibitory in trypticase soy broth cultures at the 0.01 mg/liter (0.01 ppm) level. This prior art teaches that inhibitory effects exhibited by hop extracts in media grossly over exaggerate the effectiveness of the hop extract in an actual food matrix. For example, the difference between 0.01 ppm in broth and 1000 ppm in coleslaw is a factor of 100,000. They conclude that because something works in culture media does not indicate it will work in food systems. Food systems require much higher concentrations of hop acids to show an antimicrobial effect than would have been predicted by the simple culture tests. This paper also teaches that "Overall, the antimicrobial activity of hop extracts appears to increase with acidity and lower fat content. Our results indicate that hop extracts could be used to control L. monocytogenes in minimally processed food with low fat content."

E. A. Johnson and G. J. Haas (UK Patent Application GB 2,330,076, publication date Apr. 14, 1999) teaches that hop extracts are useful antibacterial agents against *Clostridium botulinum* and *Clostridium difficile*, both Gram positive organisms. They state that concentrations of 1 ppm or greater beta acids or hop extracts inhibit the growth of these organisms. Their examples are in the form of lab culture experiments in growth media. They surmise that hop extracts can be conveniently incorporated into food products to prevent disease caused by these microorganisms. This teaching is counter to the teaching by the same authors (A. E. Larson et al.) cited above which advises that extrapolations from culture media experiments to complex foods are not straightforward.

Millis et al. (U.S. Pat. No. 5,206,586) claims the use of beta acids for inhibiting *Listeria* in packaged foods, at a concentration of 6-50 ppm. Examples show culture only, not extension to food systems. Millis et al. claims there are serious flavor limitations to the use of beta and states that beta is noticeable at 15 ppm and objectionable above 50 ppm. Millis et al.'s claims on inhibition of *Listeria* in packaged foods are not supported by examples, but based upon his demonstrations of inhibition in broth. The Larson et al. prior art cited above shows that such a sweeping generalization is not supportable.

Barney et al., U.S. Pat. No. 5,455,038, teaches that tetrahydroisohumulone and hexahydrocolupulone are superior to Millis et al.'s beta acids for inhibiting *Listeria* in cultures. Tetrahydroisohumulone inhibited *Listeria* in soy broth at a concentration of between 6-18 ppm. Under the same conditions, hexahydrocolulupone inhibited *Listeria* at 0.4 ppm.

Barney et al., U.S. Pat. No. 5,370,863 teaches that tetrahydroisohumulone can inhibit Gram-positive bacteria that cause periodontal disease.

Maye, et al., PCT Application WO 00/52212 teaches that the acid form of the hop acid is superior to the salt form in inhibiting bacteria in an aqueous process stream. All hop acids appear to be covered.

Johnson and Haas, Japanese Patent Application 11-221064 teach the use of spraying foods or drinks with a solution (preferably an ethanol solution) with a hop extract or the ingredients of a hop extract in a concentration of >1 ppm and preferably at least 5 ppm, preferably further containing beta acid, preferably in the presence of a surfactant such as tween 80.

Rhodia Corporation has introduced a line of spray-dried solids containing hop ingredients added to control Gram positive organisms. They are extensions of a product line which use propionobacteria cultures as a natural source of propionates, which are well known antimicrobial compounds effective against Gram-negative organisms. Microgard® MG 225 consists of a dextrose based culture and a natural hop flavor. This product is especially effective against cold loving Gram-negative bacteria, certain yeasts and molds and select Gram-positive bacteria. Microgard® 325 consists of a skim milk based culture and natural hop flavor. It is reportedly active against Gram-positive organisms in low fat, low protein foods.

W. J. Simpson and A. R. W. Smith (J. Appl. Bacteriol. 72, (1992), pp. 327-334) showed that antibacterial activity increases with decreasing pH and that lipid material interferes with the activity of trans-isohumulone against *Lactobacillus brevis*, a Gram positive organism.

G. J. Haas and R. Barsoumian (J. Food Protect. 57, (1994) pp. 59-61) examined isoalpha acids and beta acids against a variety of microorganisms and looked at resistance development. Minimum inhibitory concentrations of isoalpha acids were in the 0.01 to 0.03% (100-300 ppm) in tryptic soy broth. MIC for beta acids were 0.003-0.01% (30-100 ppm) in the same media against a variety of Gram-positive *Staphylococcus* organisms. *E. coli* B, a Gram negative, was not sensitive to either of the hop resins.

J. S. Hough et al., (Brew. Ind. Res. Found. 63, (1957) pp. 331-333) provide another example of effectiveness against Gram positive organisms and ineffectiveness against Gram negative (*Acetobacter suboxydans*). MIC for lupulone=1-10 ppm in culture.

J. L. Shimwell (J. Inst. Brew. 43, (1937) 191-195) provides yet another example of activity against Gram positive and inactivity or even stimulating effects against Gram negative.

The antimicrobial activity of Labiatae herbs has also been the subject of study. Most prior art indicates that the antimicrobial activity of the herbs is centered in the volatile essential oil components.

P. M. Davidson and A. S. Naidu (in Natural Food Antimicrobial Systems, A. S. Naidu, ed., 2000, CRC Press, Boca Raton, pp. 265-294) review the antimicrobial properties of phyto-phenolic compounds from essential oils of spices, herbs, edible grains and seeds. The authors teach that the antimicrobial effects of spices and herbs are primarily due to the presence of phenolic compounds in the essential oil fractions and that some terpenes seem to show some activity, as well. Carvacrol, p-cymene and thymol are identified as the major volatile components of oregano, thyme and savory that likely account for the observed activity. The active antimicrobial agents of rosemary have been suggested to be borneol, camphor, 1,8-cineole, alpha pinene, camphene, verbenone and bornyl acetate. The active constituent of sage has been suggested to be thujone. Minimum lethal concentrations of essential oils of thyme oil have been shown to range from 225-900 ppm in cultures. These concentrations of essential oils in foods would cause serious flavor problems. Since culture experiments underestimate the concentration necessary for effectiveness in foods, the flavor problems in foods are likely to be more serious than even the culture numbers suggest. In another portion of this reference, minimum inhibitory concentrations of essential oils were stated as 1-2% for rosemary, 0.12-2% for thyme, 0.12-2% for spearmint, 0.5-2% for sage, 0.5-2% for peppermint and 0.12-2% for oregano. In the summary, the authors state that concentrations of antimicrobial compounds in herbs and spices are too low to be used effectively without adverse effects on the sensory characteristics of a food.

Y. Kimura et al., U.S. Pat. No. 4,380,506, teach a process for producing a preservative having antioxidant and antimicrobial activity. The process involves partitioning an extract of herb spices between polar and non-polar solvents. Some of the partitioned extracts showed antimicrobial activity against Gram positive *Bacillus subtilis* microorganisms in culture media. This reference does not anticipate the benefits of combining hop extracts with Labia tae herb as described in the present invention. The present invention does not require the partitioning process taught by Kimura et al and avoids the use of additional processing expense.

D. Ninkov (International Application WO 01/15680 A1) teaches that pharmaceutical compositions can be prepared by combining extracts of essential oils from plants of the Labiatae family with an organic acid or group 1 salt. Ninkov teaches that the antimicrobial activity of the pharmaceutical composition is due to the presence of organic phenols such as isopropyl o-cresol in the oil extract from the plant.

K. Shetty and R. G. Labbe (Asia Pacific J. Clin. Nutr. (1998, 7(3/4): 270-276.) describe work to clone Laminacae plants to produce enhanced levels of essential oil components such as carvacrol and thymol. These essential oil components have some antimicrobial properties but their commercial use is prevented by the strong flavors imparted to foods by these volatile compounds.

J. Campo, M. Amiot and C. Nguyen-the (2000, Journal of Food Protection 63, pp. 1359-1368) teach that rosemary extract has antimicrobial properties in culture studies. Minimum inhibitory concentrations varied with the species of bacteria being tested, but ranged from 0.06-1%. Using up to one percent of an ethanolic solution of rosemary had no effect on Gram negative bacteria. These researchers suggest that rosemary extract may show promise in foods with low fat and low protein content, but only against Gram positive organisms. No food systems were actually studied.

A. E. Down, et al., "Comparison of Vitamin E, Natural Antioxidants and Antioxidant Combinations on the Lean Color and Retail Case-Life of Ground Beef Patties" published in October, 1999, http://www.ansi.okstate.edu/research/1999rr/04.htm describes the effect of rosemary extract in combination with other natural antioxidants and vitamin E diet supplementation on the color life of non-MAP ground beef. The slight increase in color life observed using natural antioxidant blend containing rosemary is statistically indistinguishable from the control. This paper does not teach how to extend the microbial shelf life of meat.

A. E. Down, et al., "Influence of Vitamin E, Duralox®, and Herbalox® on Lean Color and Retail Case-Life of Ground Beef" published in October, 1999, http://www.ansi.okstate.edu/research/1999rr/05.htm, describes the effect of rosemary extract, rosemary extract in combination with other natural antioxidants and vitamin E on the color life of non-MAP ground beef. Addition of rosemary and rosemary plus other antioxidants increases the color life of the meat over the control, but is not as effective as addition of Vitamin E. This paper does not teach how to extend the microbial shelf life of meat.

Our studies in actual meat systems show that rosemary extract, Herbalox® Seasoning, in which the majority of the volatile oil components has been removed shows very little, if any, antimicrobial effect. Herbalox® is a registered trademark of Kalsec®, Inc.

None of the prior art on the antimicrobial use of rosemary or other Labiatae herbs either anticipates or renders obvious the present invention. The prior art focuses on the use of herb essential oils. The Labiatae herb extracts used in the present invention are processed in a manner that makes them essentially free of the native essential oil. The prior art neither anticipates nor renders obvious the synergistic combination of Labiatae herb extracts and hop extract. The prior art neither anticipates nor renders obvious the flavor masking effect of Labiatae herb extracts on the bitter flavor of the hop extracts. The prior art neither anticipates nor renders obvious the surprisingly beneficial antimicrobial effect of the combination of Labiatae herb extract, hop extract and high oxygen atmosphere packaging on both Gram positive and Gram negative organisms.

OBJECTS OF THE INVENTION

An object of the present invention is to provide ways for meat manufacturers to provide retailers with products from cost efficient, cost effective central processing centers.

A further object of the present invention is to provide compositions and methods of using them to extend the shelf life of fresh meat, fish and poultry.

A still further object of the invention is to provide fresh meat, fish and poultry that has extended microbial and color shelf life in an atmosphere containing 20% or more oxygen.

Yet another object of the invention is to provide a method for blocking the bitter flavor of hop extracts in fresh meats, fish and poultry and allowing for the use of higher, and therefore effective inhibitory concentrations of hop extracts to be used without negative flavor impacts.

SUMMARY OF THE INVENTION

We have discovered that hop extracts, preferably those containing beta acids, in combination with Labiatae herb extracts, most preferably rosemary extract, containing one or more of their natural constituents, carnosic acid, carnosol and/or rosmarinic acid, enhance the color shelf life and retard the growth of microorganisms in meat, fish and poultry stored in an atmosphere that contains 20% or more oxygen. Preferred herbs are rosemary, sage, oregano, thyme and mint.

Our invention provides singly or in combination:

A composition comprising a hop extract containing beta acids and a Labiatae herb extract, wherein the Labiatae herb extract is essentially free of the native essential oils.

A composition comprising a Labiatae herb extract and a hop extract containing beta acids.

A composition comprising a Labiatae herb extract containing a Labiatae herb acid selected from the group consisting of carnosic acid, carnosol, rosmarinic acid and mixtures thereof and a hop extract containing beta acids, such that the weight ratio of the beta acids to the Labiatae herb acid is between about 0.5 and about 13.

A food selected from the group consisting of fresh meat, fish and poultry containing a Labiatae herb extract and a hop extract containing beta acids.

A food selected from the group consisting of fresh meat, poultry and fish containing a combination of a Labiatae herb extract and a hop extract containing beta acids, wherein the extracts are present in the food in ratios which effectively extends the color and bacterial shelf life of the meat, fish or poultry in an atmosphere of 20% or more oxygen.

A food selected from the group consisting of fresh meat, fish or poultry containing 50-2000 ppm of a Labiatae herb extract and 40-1000 ppm of a hop extract.

A food selected from the group consisting of fresh meat, fish or poultry containing 10 ppm or more of Labiatae herb acid selected from the group consisting of carnosic acid, carnosol, rosmarinic acid and mixtures thereof and 20 ppm or more of beta acids.

A food selected from the group consisting of fresh meat, fish and poultry containing between 19 and 500 ppm of Labiatae herb acid and between 30 and 300 ppm of beta acids.

A packaged food product comprising a food selected from the group consisting of fresh meat, fish and poultry containing a combination of a Labiatae herb extract and a hop extract containing beta acids, wherein the extracts are present in the food in ratios which effectively extends the color and microbial shelf life of the fresh meat, fish or poultry in an atmosphere containing 20% or more of oxygen.

A method of extending the color shelf life of fresh meat, fish or poultry which comprises, applying to or incorporating into said fresh meat, fish or poultry a color shelf life extending amount of a Labiatae herb extract and a hop extract containing beta acids and packaging the fresh meat, fish or poultry in an atmosphere containing 20% or more oxygen.

A method of extending the microbial shelf life of fresh meat, fish or poultry stored in an atmosphere containing 20% or more oxygen, which comprises applying to or incorporating into said meat, fish or poultry a microbial shelf life extending amount of a Labiatae herb extract and a hop extract containing beta acids and packaging the fresh meat, fish or poultry in an atmosphere containing 20% or more oxygen. The Labiatae herb extract and hop extract may be incorporated into the fresh meat, fish or poultry separately or together. The preferred method is to incorporate them together in the form of a composition.

A method of inhibiting the growth of bacteria in food selected from the group consisting of fresh meat, fish and poultry which comprises applying to or incorporating into the fresh meat, fish or poultry a combination of a Labiatae herb extract and a hop extract containing beta acids and packaging the fresh meat, fish or poultry in an atmosphere containing 20% or more oxygen.

A method of inhibiting the growth of Gram negative bacteria in food selected from the group consisting of fresh meat, fish and poultry which comprises applying to or incorporating into the fresh meat, fish or poultry a combination of a Labiatae herb extract and a hop extract containing beta acids and packaging the fresh meat, fish and poultry in an atmosphere containing 20% or more oxygen. Preferred is a method wherein the weight ratio of beta acids to Labiatae herb acid is between about 0.5 and about 13.

A method for blocking the bitter taste of hop extract containing beta acids that has been applied to or incorporated into fresh meat, fish or poultry which comprises also applying or incorporating Labiatae herb extract to the fresh meat, fish or poultry and packaging the fresh meat, fish or poultry in an atmosphere containing 20% or more oxygen.

A composition comprising a Labiatae herb extract containing a Labiatae herb acid selected from the group consisting of carnosic acid, carnosol, rosmarinic acid and mixtures thereof and a hop extract containing beta acids, such that the weight ratio of the beta acids to the Labiatae herb acid is between about 0.5 and about 13.

The mixture of beta acids and Labiatae herb acids may be diluted in one or more carriers, solubilizers or diluents consisting of decaglycerol monooleate (such as found in the commercial product Mazol® PGO 104k), fatty acid esters (such as found in Drewpol® 10-1-CC), benzyl alcohol, ethyl alcohol, propylene glycol, vegetable oil, polysorbates, sorbitans, such as sorbitan trioleate, capric/caprylic triglycerides, and dextrose. Mazol® PGO 104k is a registered trademark of BASF. Drewpol® 10-1-CC is a registered trademark of Stepan, Inc.

The combination of Labiatae herb extract and hop extract is applied to or incorporated into fresh meat, fish, or poultry by spraying, injecting, dipping, painting, vacuum tumbling, marinating, mixing, pumping, by dispersion on a carrier and combinations thereof. They can also be added together with additives such as polyphosphates, salt, water, flavors, broths, added proteins, sugars and starches in combined form or sequentially.

The Labiatae herb extract and the hop extract can be applied separately either in combination with other flavorings and adjuvants and emulsifiers or together as a single composition.

The preferred Labiatae herb extracts are obtained from rosemary, oregano, thyme, sage, and mint. Rosemary is most preferable. These extracts contain one or more of the Labiatae herb acids consisting of carnosic acid, carnosol, and rosmarinic acid.

Surprisingly, when incorporated into meat stored in anoxic conditions, under nitrogen, for example, the hop extracts alone, or hop extracts plus Labiatae herb extracts are completely ineffective as antimicrobial agents, showing that the presence of oxygen is critical to the invention.

The invention is particularly suited for use with modified atmosphere packaged (MAP) meats. MAP meats are packaged in gas impermeable materials that maintain an atmosphere above the product. Mixtures of oxygen and carbon dioxide are often used in MAP meats. Mixtures of these gases work very well with the present invention. One might think that the $CO_2$ present in a modified $O_2/CO_2$ atmosphere might serve to lower the pH of the meat samples through formation of carbonic acid and increase the effectiveness of the hop acid, but pH measurements on the meats during storage show no differences between those stored under $N_2$ and those stored under 80/20 $O_2/CO_2$. The pH remains in the 5.7 to 6.2 range in both cases.

Prior art teaches that although minimum inhibitory concentrations (MIC) of beta acids are in the 1 ppm range in culture media, these MICs do not translate well to complex food systems. Johnson, et al., cited above, reports MIC for milk to be 1000 ppm (4% fat) and to be >10,000 ppm for camembert cheese (~24% fat). As fat content increases in foods, the antibacterial activity of hop acids decreases. These are similar to Larson's, et al., teaching (cited above), where 100 ppm was effective in skimmed milk, and 1000 ppm was required in whole milk. Prior art suggests that hop acids may prove to be useful as antimicrobial agents only in low fat foods. We have found, surprisingly, that hop acids, and beta acids in particular can be used in hamburger with fat contents of 10-30%, or more. The most effective concentrations range from 20 to 200 ppm beta acids. When hop acids alone are used at concentrations above 20 ppm to 60 ppm in ground beef, depending upon the fat content, objectionable flavors are readily discernable. Surprisingly, the addition of rosemary extracts, or extracts of other Labiatae herbs at subliminal flavor levels masks the objectionable flavor, allowing for effective concentrations of hop acids to be employed without a negative flavor impact. Also, surprisingly, hop extracts and Labiatae herb extracts have been found to preserve color in MAP ground beef in a synergistic manner. In samples of ground beef stored 10 days in the dark, hop extract plus rosemary extract provides double the color preserving additive effect of hops or rosemary alone. Hop extracts alone are prooxidant during light storage following dark storage of ground beef whereas the combination of hop extract and rosemary extract provides the best color stability under these conditions. Another surprising finding relates to the effect of the combination of hop extract, rosemary extract and oxygen containing modified atmosphere packaging on Gram negative bacteria.

The prior art is replete with statements that Hop extracts have little to no inhibitory effect on Gram negative organisms. Surprisingly, we have found evidence that beta acids in the presence of high oxygen concentrations inhibit *Aeromonas hydrophila* and *Escherichia coli*, both Gram negative organisms. The combination of hop beta acids and high oxygen atmosphere also inhibits *Serratia liquefaciens*, a Gram negative organism isolated as a major spoilage organism in ground beef. Even more surprisingly, the combination of rosemary and hop extracts show synergistic inhibition of these Gram negative organisms, with the most pronounced effects of synergism being seen under high oxygen atmospheres.

The combination of Labiatae herb extract and hop extract containing beta acids prolongs the color of fresh meat, fish and poultry in the presence of oxygen in a synergistic manner. Critical to this invention is the combination of rosemary extract or other effective Labiatae herb extract and beta acids and the presence of oxygen. The beneficial effect of the combination of Labiatae herb extract and hop beta acids does not occur in the absence of oxygen.

Hop extract alone decreases the color life of fresh red meat (during storage in a lighted display case) and results in an unacceptable flavor. The combination of rosemary extract and hops extracts acts synergistically to extend the color life of ground beef in dark storage conditions. The combination is not just additive, but is synergistic, because it doubles the additive effect of hops alone and rosemary alone.

The addition of Labiatae herb extract to beta acid containing hop extract increases the amount of bitter beta acids which can be tolerated flavor-wise to a level which is effective in preserving color and in inhibiting the growth of microorganisms in fresh meat, fish and poultry.

The combination of Labiatae herb extract, preferably, rosemary extract, and hop extract containing beta acids is more effective in suppressing both Gram positive and Gram negative bacterial growth than either Labiatae herb extract or hop extract containing beta acids alone. Prior art shows that beta acids alone do not suppress Gram negative bacteria, whereas the combination of Labiatae herb, hop extract and oxygen does suppress them.

The combination of Labiatae herb extract and hop extract containing beta acids in the presence of oxygen, but not in its absence, improves the flavor of ground beef in a package after a commercially desirable storage period. Neither Labiatae herb extract or hop extract alone, or oxygen alone, or a combination of two of these factors alone preserves flavor as well as the combination of the three at the end of a commercially desirable storage period.

DETAILED DESCRIPTION OF THE INVENTION

The present invention provides compositions comprising Labiatae herb extract and hop extract and methods for using said compositions for extending the shelf life of fresh meat, fish and poultry.

Before proceeding further with a description of the preferred embodiments of the invention, a number of terms will be defined.

Definitions

As use herein:

"Fresh meat, fish, and poultry" means entire carcasses, cut portions thereof, and ground portions thereof and may include additives such as polyphosphates, salt, water, flavors, broths, added proteins, sugar, starches and the like which are incorporated into the meat, fish or poultry. It is important to distinguish fresh meat, fish or poultry which may contain these ingredients and are covered by the present invention from cured meat, fish and poultry, which may contain the same ingredients, but also contain one or more of the following: erythorbates, erythorbic acid, ascorbates, ascorbic acid, nitrites, nirates or cultures. The present invention is limited to fresh meat, fish and poultry and does not include cured meat, fish or poultry.

"Hop extract means an extract of hops containing beta acids and optionally other hop constituents present in the hops.

"Labiatae herb extract" means extract from a plant of the Labiatae genus, preferably rosemary, sage, oregano, thyme, mints and mixtures thereof. The most preferred is rosemary.

"Labiatae herb acid" means carnosic acid, carnosol, rosmarinic acid and mixtures thereof.

Materials and Methods

Hop extracts were obtained by extracting hops with super or sub critical carbon dioxide, or with food grade solvents. The hop extracts can be partitioned according to well known methods into fractions containing largely alpha acids and fractions containing largely beta acids. Extracts can also contain various gums, resins and other hop acid derivatives and hop constituents. Hop extracts containing the following ranges can be employed in this invention, but are not considered limiting:

Beta acids (lupulones) 20% to 100% alpha acids (humulones) 0% to 50% resins, waxes, etc. remainder of the composition of the extract.

Emulsifiers, edible solubilizing agents, and other adjuvants can be added to aid in preparation and use of the hop extract formulations.

Rosemary herb extracts can be prepared by extracting rosemary with food grade solvents or with supercritical carbon dioxide. Extracts consisting largely of lipophillic components contain carnosic acid and carnosol and other phenolic constituents. The amount of carnosic acid in the extract can range from 0.5 to 50% or more. Carnosol contents can range from 0.1 to 10% or more. Extracts consisting largely of hydrophillic substances contain rosmarinic acid. Rosmarinic acid content can range from 0.1 to 35% or more, however, these concentrations in the extract are not considered limiting. Extracts made using solvents of intermediate polarity contain both the lipophilic and hydrophilic components. Carriers, such as vegetable oil, emulsifiers, propylene glycol, edible solvents, and other adjuvants can be used in the formulations. Herbalox® Seasoning is a registered trademark of Kalsec®, Inc.

Extracts from oregano, sage, thyme and mint can be prepared utilizing methods well known in the art, including those described above for preparing rosemary extracts.

The extracts used in the present invention can either be in the form of both lipophilic and hydrophilic preparations alone or mixtures thereof. It is also within the scope of the present invention to combine the Labiatae extracts and hop extracts with flavorings in the form of spice extracts such as black pepper, celery, white pepper, garlic and onion or synthetic flavorings such as reaction flavors and glutamates.

The rosemary extract and hop extract containing beta acid were combined in appropriate amounts and heated and stirred between 80-110° C. to give the concentrations used in the examples. As beta acids tend to crystallize out of the solution upon standing, samples were heated the morning of meat sample preparation to insure the beta acids were completely dissolved. Actual analysis of the combined rosemary and beta acid sample was performed to determine the amount of Labiatae herb extract and beta acids actually added to the meat.

Compositions utilizing oregano, sage, thyme, mint extracts and mixtures thereof can be prepared by combining the appropriate Labiatae herb extract or extracts with the hop extract as is described above for compositions containing rosemary extract.

Preparation of Meat Samples

Coarse ground, vacuum packed ground chuck (~19% fat) in 14 pound chubs was obtained from Hoekstra Meat Company. The ground chuck was weighed into 17 pound batches and blended with the composition of Labiatae herb extract and hop extract for 2 minutes in a Mainca RM-35 meat mixer/blender. Blending was conducted by reversing the direction of the ribbon/paddle blades every 15 seconds during the two minute blend time. Where a treatment was added, one half of the required amount of composition was layered onto about half of the batch of meat initially, followed by the remaining half of the meat and then the remaining treatment. Dry ice, crushed to a particle size of less than 1.7 mm, was added after 30 seconds of the two minute blending time to maintain the meat temperature between 28° F. to 32° F. during blending. Meat was then ground through a ⅛" plate into one pound (±0.10#) samples. Ground meat was packaged into Cryovac CD92 trays using a MAP packaging machine with barrier film. An ILPRA Basic 100 VG single mold MAP packaging machine using a heat seal temperature of 110° C. and heat seal time of 4 seconds was used to package the meat samples. Samples were sealed under atmospheres of 20% or more of oxygen, preferably 80% $O_2$ and 20% $CO_2$, or 100% Nitrogen using a −700 mm Hg vacuum and +30 mm Hg gas back flush. Packaged meat was stored in the dark (32-35° F.) for a stated amount of time, then, optionally, placed in the light box with 200 foot candles CWF light, and a temperature of 32-35° F.

Samples were evaluated by colorimetry and headspace analysis. Color measurements were made using a Minolta CR-300 Chroma meter using the "C" light source and multi measure reading (average of three successive readings) to measure the C.I.E. 1976 L* a* b* values. Colorimeter readings were taken through the film on the meat after the film had been cut from the package and pressed firmly against the meat to create a flat surface free from valleys and pockets of air. Three readings along the diagonal of each package were taken. When calorimeter readings were taken on MAP samples under nitrogen headspace, the MAP packages were opened and allowed to rebloom for 10 minutes prior to the measurements. CIE Lab color measurement system defines a three dimensional color space in which values L*, a* and b* are plotted at right angles to each other. L* is a measure along an axis representing lightness or darkness. A measure along a red/green axis gives a* and a measure against a yellow/blue axis is represented by b*. CIE Lab is a popular color space for use in measuring reflective and transmissive objects. The a* value is widely used in the meat industry as a measure of redness. The higher the a*, the more acceptable, and the invention, by increasing the retention of a* over the control, allows an a* of even 17 or higher to be achieved under commercial conditions.

The headspace gas composition was determined using a PBI Dansensor Checkmate 9900 $O_2/CO_2$ analyzer to measure $O_2$ and $CO_2$ concentrations on the packaged samples. Measurements were made using the manual spot test mode with a three second delay to flush the line and a five second measuring period. As the headspace and colorimetry analyses are destructive tests, samples were discarded after analysis.

Samples were analyzed on specific days as described in the examples. The microbiological assays were performed by two independent and professionally qualified laboratories using AOAC Official Methods (988.18 and 991.14), and other appropriate analytical methods.

EXAMPLE 1

Demonstrating Beneficial Effect of a Combination of Hop Extract and Rosemary Extract on the Color and Microbial Shelf Life of High Oxygen Modified Atmosphere Packaged Ground Beef.

Ground Beef samples were prepared according to the method described in the Materials and Methods section and packaged in oxygen impermeable packaging under an atmosphere of 80% oxygen and 20% carbon dioxide. The treatments consisted of the following:

A. Control (no additives)

B. Rosemary extract (0.1% lipophilic rosemary extract added to meat, giving final carnosic acid concentration in meat of approximately 20 ppm.

C. Hop extract (0.1% hop extract added to meat, giving final beta acid concentration in meat of approximately 194 ppm.

D. Hop extract plus lipophilic rosemary extract (0.1% of a combination of lipophilic rosemary extract an hop extract added to meat, giving final carnosic acid and beta acid concentrations in meat off approximately 20 ppm and 194 ppm, respectively.

The meat was stored in the dark and samples were pulled at days 0, 5, 10, 18, and 21. These samples were analyzed to determine the effect of the treatments on properties during dark storage. A number of additional samples were pulled at day 10 and placed in a lighted, refrigerated display case to simulate retail storage. Individual samples were pulled after 1, 2, 3, and 4 days additional storage in the light.

Table 1 shows the effect of the treatments on the total plate count (aerobic+anaerobic plate counts) in ground beef stored in the dark at 32-35 deg. Fahrenheit during storage. The Table clearly shows that beta acids drastically delay the growth of microorganisms in ground beef. It further shows the dramatic synergistic effect of hops plus rosemary extracts.

TABLE 1

Effect of Treatments on sum of Aerobic and
Anaerobic Plate Count. 80% Oxygen/20% Carbon Dioxide

| Day | A. Control | B. Rosemary | C. Hops | D. Hops + Rosemary |
|---|---|---|---|---|
| 0 | 6,500 | 3,270 | 2,500 | 8,100 |
| 5 | 73,000 | 57,000 | 2,000 | 3,000 |
| 10 | 1,580,000 | 1,150,000 | 6,000 | 6,000 |
| 18 | 98,000,000 | 116,000,000 | 7,000 | 4,000 |
| 21 | 320,000,000 | 270,000,000 | 1,510,000 | 344,000 |

Samples stored in the dark were analyzed for color. Color values were plotted out and fitted with least square lines. Using an $a^*$ value of 17 as a value denoting a marginally acceptable color, the length of time each sample took to reach a marginally acceptable $a^*$ value of 17 was determined. These results are shown in Table 2, below.

TABLE 2

Effect of treatments on color stability of ground beef during dark storage.

| Sample | Initial $a^*$ | Days to $a^* = 17$ |
|---|---|---|
| A. Control | 27.5 | 13 |
| B. Rosemary | 25.9 | 15 |
| C. Hops | 27.4 | 14 |
| D. Hops + Rosemary | 27.4 | 19 |

Rosemary extract alone adds 2 days to the dark storage color life of the control. Hop extract adds only a single day. Together, if the effect were additive, the combination should provide an additional 3 days to the color life, namely 16 days. The combination actually provides 6 days additional color life, showing a synergistic effect of the combination.

Table 3 shows the effect of the treatments on the color life of ground beef during storage under light after the ground beef had been stored in the dark for 10 days previously. Again, $a^*=17$ is used as a cut off for acceptability, time to $a^*=17$ is shown in the table.

TABLE 3

Effect of treatments on color stability of ground beef during light storage after 10 day's dark storage.

| Sample | Days in light to $a^* = 17$ after 10 days dark storage |
|---|---|
| A. Control | 2.1 |
| C. Hops | 1.4 |
| D. Hops + Rosemary | 2.6 |

This data shows that beta alone is detrimental to the color life of the control during storage under fluorescent lighting.

EXAMPLE 2

Demonstrating the Ineffectiveness of a Combination of Hop Extract and Rosemary Extract on the Microbial Shelf Life of Modified Atmosphere Packaged Ground Beef in the Absence of Oxygen.

The meat samples were prepared as in Example 1, except the meat was packaged under nitrogen. Table 4 shows that none of the additives are effective antimicrobial treatments for ground beef stored under nitrogen, showing that the presence of oxygen is critical to this invention.

TABLE 4

Effect of Treatments on sum of Aerobic and Anaerobic Plate Count. 100% Nitrogen

| Day | A. Control | B. Rosemary | C. Hops | D. Hops + Rosemary |
|---|---|---|---|---|
| 0 | 6,500 | 3,270 | 2,500 | 8,100 |
| 5 | 102,000 | 144,000 | 98,000 | 21,000 |
| 10 | 8,100,000 | 6,700,000 | 1,260,000 | 630,000 |
| 18 | 74,000,000 | 65,000,000 | 31,000,000 | 36,000,000 |

EXAMPLE 3

Demonstrating Dose Response of Beta Acids as an Antimicrobial Treatment in MAP Packaged Ground Beef. Demonstrating that doses between 50 and 100 ppm are optimal to protect 19% fat containing ground beef.

Ground beef samples were prepared according to the method described in the Materials and Methods section and packaged in oxygen impermeable packaging under an atmosphere of 80% oxygen and 20% carbon dioxide. The treatments consisted of the following:

A. Control (no additives)

B. Lipophilic Rosemary extract (0.1% lipophilic rosemary extract added to meat, giving final carnosic acid concentration in meat of approximately 20 ppm.

C. Hop extract plus lipophilic rosemary extract (0.1% of a combination of lipophilic rosemary extract and hop extract added to meat, giving final carnosic acid and beta acid concentrations in meat of approximately 20 ppm and 194 ppm, respectively.

D. Hop extract plus lipophilic rosemary extract (0.1% of a combination of lipophilic rosemary extract and hop extract added to meat, giving final carnosic acid and beta acid concentrations in meat of approximately 20 ppm and 105 ppm, respectively.

E. Hop extract plus lipophilic rosemary extract (0.1% of a combination of lipophilic rosemary extract and hop extract added to meat, giving final carnosic acid and beta acid concentrations in meat of approximately 20 ppm and 50 ppm, respectively.

F. Hop extract plus lipophilic rosemary extract (0.1% of a combination of lipophilic rosemary extract and hop extract added to meat, giving final carnosic acid and beta acid concentrations in meat of approximately 20 ppm and 10 ppm, respectively.

The meat was stored in the dark and samples were pulled at days 0, 5, 10, and 18 and analyzed for aerobic and anaerobic plate count.

Table 5 shows that the effect is dependent on dose and that a dose of greater than about 50 ppm beta is required to get the desired commercially acceptable effect in this specific meat. This will be dependent upon the initial bacterial load of the starting meat. The invention is most effective in meats prepared under sanitary conditions.

TABLE 5

Effect of Treatments on sum of Aerobic and Anaerobic Plate Count. Effect of Beta Acid Dose

| Day | A. Cont. | B. Rose. | C. Rose. + 194 ppm beta | D. Rose. + 105 ppm beta | D. Rose. + 50 ppm beta | D. Rose. + 10 ppm beta |
|---|---|---|---|---|---|---|
| 0 | 300 | 300 | 600 | 200 | 200 | 900 |
| 5 | 25,000 | 9,600 | 1,000 | 2,100 | 3,200 | 6,900 |
| 10 | 2,500,000 | 900,000 | 1,100 | 32,000 | 370,000 | 1,480,000 |
| 18 | 127,000,000 | 124,000,000 | 1,800 | 160,000 | 68,000,000 | 129,000,000 |

EXAMPLE 4

Demonstrating the effectiveness of hydrophilic extracts of rosemary in combination with hop beta acids and high oxygen atmosphere packaging.

Ground beef samples were prepared according to the method described in the Materials and Methods section and packaged in oxygen impermeable packaging under an atmosphere of 80% oxygen and 20% carbon dioxide. The treatments consisted of the following:

| A. | Control (no additives) |
|---|---|
| B. | Hydrophilic rosemary extract (0.1% hydrophilic rosemary extract added to meat, giving final rosmarinic acid concentration in meat of approximately 32 ppm. |
| C. | Hydrophilic rosemary extract plus hop extract (0.1% of a combination of hydrophilic rosemary extract and hop extract added to meat, giving final rosmarinic acid and beta acid concentrations of approximately 32 and 194 ppm, respectively. |

The effect of these treatments on aerobic plus anaerobic plate counts is shown in Table 6.

TABLE 6

Effect of Treatments on sum of Aerobic and Anaerobic Plate Count. Hydrophilic rosemary extracts.

| Day | A. Control | B. Hydrophilic Rosemary | C. Hydrophilic Rosemary + Beta |
|---|---|---|---|
| 0 | 300 | 400 | 200 |
| 5 | 25,000 | 11,200 | 3,000 |
| 10 | 2,500,000 | 840,000 | 222,000 |
| 18 | 127,000,000 | 165,000,000 | 20,000,000 |

EXAMPLE 5

Demonstrating the flavor protecting effect of rosemary extract on meat samples containing hop beta acids.

Meat samples were prepared by blending the appropriate amounts of hop and/or rosemary extracts with ground beef of 10, 20 and 30% fat contents. Ground beef samples were cooked on a broiler to an internal temperature of 155 degrees F. Panels were conducted while ground beef was still warm. Thresholds were determined using an ascending forced-choice method (n=20 panelists). Triangle tests were performed with various concentrations of beta acids (with and without rosemary extract) as the odd sample. The threshold values represent the concentration where the number of panelists selecting the odd sample was not significant (low value of the range) and the lowest concentration where the number of panelists selecting the odd sample was significant (high value of the range). Values are given in ppm of beta acids in Table 7. Rosemary extract concentration was 0.1 wt %.

TABLE 7

Flavor Thresholds for Beta in Ground Beef in the Absence and Presence of Rosemary Extract.

| Meat Block (lean/fat) | Beta Acids in Hop Extract | Beta Acids + Rosemary Extract |
|---|---|---|
| 90/10 | <20 ppm | 40-60 ppm |
| 80/20 | <40 ppm | 60-80 ppm |
| 70/30 | <60 ppm | 80-100 ppm |

A difference from control test with 45 panelists revealed a significant decrease in off-flavor scores for Herbalox (0.1%)+ beta (150 ppm) compared with beta. This shows that rosemary extract masks the bitterness of the hop extract containing beta acid, which is unexpected, since rosemary extracts do not contain sweet or other substances which might overpower the bitterness.

We have found surprising and synergistic effects of hop extracts containing beta acids combined with rosemary extracts on inhibition of anaerobic and aerobic Gram negative and Gram positive bacterial growth in culture medium and in red meat.

As reported in the prior art literature, beta and other hop acids have an inhibitory effect on gram positive bacteria, some of which are pathogenic. They are believed, however, to have no inhibitory effects on gram negative bacteria, some of which are pathogenic and which also contribute to spoiling and discoloration of meat. As the following examples will show, this is not the case in atmospheres of elevated oxygen, and some species are even inhibited in atmospheres of normal air, which is about 20% oxygen. However, atmospheres above 40%, and preferably above 60%, and most preferably in the 70% to 80% and above oxygen are preferred, with the other gas being CO2.

The procedures for evaluating three species of common bacteria were performed as follows:

Three different genera of Gram negative bacteria were tested. The procedure employed Enriched Nutrient Agar plates seeded with fresh bacterial cultures spread over the plate to give a lawn of bacterial growth after incubation at 22° C. Whatman 3 mm paper disks (8 mm diameter) containing the test compounds at designated dose levels in 95% ethanol were placed on the plates after allowing the disks to dry in a sterile environment. The hop extract used to dose the disks contained 1.29 g beta acids in 10 ml of ethanol, and different amounts of the ethanolic solution was used to provide different doses of beta acids to the disks used in the tests. In the experiments to test the combined effects of rosemary and hop extracts, the rosemary extract was added to the enriched nutrient agar directly at levels of 500, 1000 and 2000 ppm. The rosemary extract used for dosing the agar contained 7.4% carnosic acid and 1.0% carnosol and 2.7% rosmarinic acid. The rosemary extract (an ethanol extract) was dissolved in 95% ethanol at a rate of 2.63 grams per 10 ml of ethanol. Appropriate amounts of this solution were added to the Agar to give the concentrations used in the experiment. The agar containing 1000 ppm rosemary extract contained approximately 74 ppm carnosic acid, 10 ppm carnosol and 27 ppm rosmarinic acid. A control disk dipped in ethanol was also placed on the plate. Clear zones in the bacterial lawn (confluent bacterial growth) around the disks, measured in mm, after incubation in various atmospheres were used to estimate extent of antibacterial activity of the compounds added to the disks. Zones of inhibition were measured in millimeters. The disks are 8 mm, thus 9 mm means that there was 1 mm zone of inhibition around the disc. A 0 means no zone of inhibition was observed. In all cases, no inhibition was observed around the control disks. These plate assays reveal that the concentration of bacteria used to innoculate the plate was critical for the observation of the clear zones which indicate antibacterial activity. Assays were performed with three plates. The second plate was innoculated with one tenth the number of bacteria as the first plate and the third plate was innoculated with one tenth the amount of bacteria as the second. In all cases studied, the zones of inhibition increased with decreasing initial bacterial load.

EXAMPLE 6

Demonstrating the inhibitory effects on *Aeromonas hydrophila* strain ATCC7965.

The results, in Tables 8, 9 and 10, show that inhibition occurs with beta alone, is dose dependent, and that rosemary extract enhances the inhibition and is also dose dependent in the presence of oxygen. An 80-20 oxygen atmosphere is much more effective than air, and at the highest rosemary dose the inhibition was TLM (too large to measure). Surprisingly, rosemary shows a negative influence on the activity of beta acids in anoxic conditions.

TABLE 8

Measure of inhibition on *Aeromonas hydrophila* ATCC 7965 under air (21% oxygen).

| Beta Acid on disk | Zone of inhibition (in mm) | | | |
|---|---|---|---|---|
| | No Rosemary in Agar | 500 ppm Rosemary in Agar | 1000 ppm Rosemary in Agar | 2000 ppm Rosemary in Agar |
| 1.29 µg | 14 | 11 | 14 | 16 |
| 2.58 µg | 18 | 15 | 18 | 20 |
| 3.87 µg | 20 | 18 | 20 | 25 |

TABLE 9

Measure of inhibition on *Aeromonas hydrophila* ATCC 7965 under 80% oxygen and 20% carbon dioxide.

| Beta Acid on disk | Zone of inhibition (in mm) | | | |
|---|---|---|---|---|
| | No Rosemary in Agar | 500 ppm rosemary in Agar | 1000 ppm rosemary in Agar | 2000 ppm rosemary in Agar |
| 1.29 µg | 12 | 16 | 28 | TLM |
| 2.58 µg | 18 | 18 | 32 | TLM |
| 3.87 µg | 28 | 32 | 36 | TLM |

TLM means too large to measure.

TABLE 10

Measure of inhibition on *Aeromonas hydrophila* ATCC 7965 under Nitrogen.

| Beta Acid on disk | Zone of inhibition (in mm) | | | |
|---|---|---|---|---|
| | No Rosemary in Agar | 500 ppm rosemary in Agar | 1000 ppm rosemary in Agar | 2000 ppm rosemary in Agar |
| 1.29 µg | 15 | 12 | 9 | 9 |
| 2.58 µg | 19 | 15 | 9 | 9 |
| 3.87 µg | 22 | 20 | 9 | 9 |

EXAMPLE 7

Demonstrating the inhibitory effects on *Escherichia coli* ATCC strain 25922. The results are given in Tables 11, 12, and 13. There was no inhibition by beta alone or beta plus rosemary in an anoxic atmosphere. There was significant inhibition in air, and much superior inhibition in an 80/20 oxygen/carbon dioxide atmosphere. The inhibition was dose dependent for both beta acids and beta acids plus rosemary. The presence of rosemary approximately doubled the effectiveness of the beta acids.

TABLE 11

Measure of inhibition on *Escherichia coli* ATCC 25922 under air (21% oxygen).

| Beta Acid on disk | Zone of inhibition (in mm) | | | |
|---|---|---|---|---|
| | No Rosemary in Agar | 500 ppm Rosemary in Agar | 1000 ppm Rosemary in Agar | 2000 ppm Rosemary in Agar |
| 1.29 µg | 0 | 0 | 9 | 12 |
| 2.58 µg | 0 | 9 | 9 | 14 |
| 3.87 µg | 10 | 9 | 10 | 16 |

TABLE 12

Measure of inhibition on *Escherichia coli* ATCC 25922 under 80% oxygen and 20% carbon dioxide.

| Beta Acid on disk | Zone of inhibition (in mm) | | | |
|---|---|---|---|---|
| | No Rosemary in Agar | 500 ppm Rosemary in Agar | 1000 ppm Rosemary in Agar | 2000 ppm Rosemary in Agar |
| 1.29 µg | 0 | 0 | 16 | 24 |
| 2.58 µg | 10 | 14 | 18 | 24 |
| 3.87 µg | 12 | 18 | 20 | 24 |

TABLE 13

Measure of inhibition on *Escherichia coli* ATCC 25922 under Nitrogen.

| | Zone of inhibition (in mm) | | | |
|---|---|---|---|---|
| Beta Acid on disk | No Rosemary in Agar | 500 ppm Rosemary in Agar | 1000 ppm Rosemary in Agar | 2000 ppm Rosemary in Agar |
| 1.29 µg | 0 | 0 | 0 | 0 |
| 2.58 µg | 0 | 0 | 0 | 0 |
| 3.87 µg | 0 | 0 | 0 | 0 |

EXAMPLE 8

Demonstrating the inhibitory effects on *Serratia liquefaciens*. *Serratia liquefaciens* was isolated from a ground meat sample. The results of the zone inhibition tests are given in Tables 14, 15, and 16. Under anoxic conditions, only the highest dose of beta acids alone was effective, but lower doses were effective in the presence of rosemary. The highest dose of rosemary, 2000 ppm, had no effect. Performance was improved in the presence of air, and the improvement was greater in an 80/20 atmosphere.

TABLE 14

Measure of inhibition on *Serratia liquefaciens* under air (21% oxygen).

| | Zone of inhibition (in mm) | | | |
|---|---|---|---|---|
| Beta Acid on disk | No Rosemary in Agar | 500 ppm Rosemary in Agar | 1000 ppm Rosemary in Agar | 2000 ppm Rosemary in Agar |
| 1.29 µg | 0 | 0 | 0 | 0 |
| 2.58 µg | 0 | 0 | 0 | 0 |
| 3.87 µg | 0 | 9 | 0 | 0 |

TABLE 15

Measure of inhibition on *Serratia liquefaciens* under 80% oxygen and 20% carbon dioxide.

| | Zone of inhibition (in mm) | | | |
|---|---|---|---|---|
| Beta Acid on disk | No Rosemary in Agar | 500 ppm Rosemary in Agar | 1000 ppm Rosemary in Agar | 2000 ppm Rosemary in Agar |
| 1.29 µg | 0 | 0 | 0 | 0 |
| 2.58 µg | 9 | 0 | 14 | 12 |
| 3.87 µg | 12 | 10 | 16 | 15 |

TABLE 16

Measure of inhibition on *Serratia liquefaciens* under Nitrogen.

| | Zone of inhibition (in mm) | | | |
|---|---|---|---|---|
| Beta Acid on disk | No Rosemary in Agar | 500 ppm Rosemary in Agar | 1000 ppm Rosemary in Agar | 2000 ppm Rosemary in Agar |
| 1.29 µg | 0 | 10 | 9 | 0 |
| 2.58 µg | 0 | 11 | 9 | 0 |
| 3.87 µg | 10 | 12 | 9 | 0 |

These examples show that different Gram negative organisms respond differently at given dosage levels, but that all are significantly more responsive under increasing oxygen atmospheres. They also show that rosemary dosage generally has a positive effect on the inhibition, but that overdosing of rosemary may have a negative effect.

Since inhibition is greater and more long lasting for lower inoculation rates in the media, optimum dosing in commercial practice will depend upon the initial bacterial load in the meat. The dosage and combination can be determined by one of reasonable skill in the art.

EXAMPLE 9

Ground beef was prepared and dosed as in the procedure described above in the Materials and Methods section. It was incubated at 4° C. for 16 days in the dark under an 80/20 oxygen/carbon dioxide atmosphere. At this time, samples were withdrawn and the number of colony forming units determined in a culture medium. The number of colony forming units was approximately half in the beta acid and beta acid+rosemary samples. These colonies consist of aerobic and anaerobic bacteria, and therefore the example shows that both Gram positive and Gram negative types of bacteria are inhibited by the treatment. This supports Example 1 and is another example in fresh meat.

EXAMPLE 10

Ground beef containing about 30% fat obtained from a second commercial source was dosed with rosemary extract containing carnosic acid, with sufficient hop extract to provide 75 ppm beta acids and 19 ppm carnosic acid in the rosemary extract, 150 ppm beta acids in the hop extract and 19 ppm carnosic acid in the rosemary extract, and soybean oil as a control. The ground beef was packaged in an 80/20 atmosphere in oxygen impermeable plastic. The samples were evaluated for bacterial count at the end of 12 days dark storage and 2 days light storage, both at 4° C., under an 80/20 atmosphere. The beef was then macerated and cultured, and the number of colony forming units in two meat samples from each treatment was evaluated after incubating at 22° C. for 48 hours. The results of five replicates of each treatment were averaged. Neither the rosemary alone or the control were significantly different, but both the combinations of rosemary and hop extract had a third or less of the number of colony forming units than the control or rosemary alone.

A second evaluation of the same meat samples by the standard AOAC Official Method 990.12 for aerobic Plate Count in Foods, and by the procedure from the "Compendium of Methods for the Microbiological Examination of Foods", Ch 9 of the 3$^{rd}$ edition for anaerobic plate count, was performed. Five samples from each treatment were assayed for both anaerobic and aerobic bacterial count, after 12 days in the dark and 2 days in the light at 4° C. The results are reported in Table 17.

TABLE 17

Effect of Hop extract and Rosemary Extract on Anaerobic and Aerobic Plate Count of 30% Fat Ground Beef.

| Beta Acid Dose, ppm | Carnosic Acid Dose, ppm | Plate Count, in thousands Anaerobic | Plate Count, in thousands Aerobic |
|---|---|---|---|
| 0 | 19 | 568 | 438 |
| 75 | 19 | 286 | 58 |

TABLE 17-continued

Effect of Hop extract and Rosemary
Extract on Anaerobic and Aerobic Plate
Count of 30% Fat Ground Beef.

| Beta Acid Dose, ppm | Carnosic Acid Dose, ppm | Plate Count, in thousands Anaerobic | Plate Count, in thousands Aerobic |
|---|---|---|---|
| 150 | 19 | 434 | 56 |
| 0 | 0 | 648 | 532 |

Both results show that both combinations of hop extract and rosemary extract suppressed aerobic and anaerobic bacteria significantly more than either the rosemary alone or the control.

They are consistent with the synergistic suppression of the anaerobic bacteria in culture media by a combination of rosemary and hop extract.

EXAMPLE 11

Demonstrating the Effect of a Range of Rosemary Extract Concentration in Combination with Hop Extract on the Color and Microbial Shelf Life of High Oxygen Modified Atmosphere Packaged Ground Beef.

Ground beef samples were prepared according to the method described in the Materials and Methods section and packaged in oxygen impermeable packaging under an atmosphere of 80% oxygen and 20% carbon dioxide. The treatments provided meat with approximately 117 ppm hop beta acids and a range of rosemary extract concentrations. The samples provided from 9 to 74 ppm carnosic acid in the final meat product. Analysis of total plate count showed that changing the rosemary extract concentration over this range did not have a significant effect on the antibacterial activity.

EXAMPLE 12

Demonstrating the high oxygen atmosphere packaging of ground pork treated with a combination of hop beta acids and rosemary extract.

Fresh ground pork is treated with a composition of a hop extract providing a level of 100 ppm hop beta acid and a lipophilic rosemary extract providing approximately 20 ppm carnosic acid. The ground pork is packaged under an atmosphere of 80% oxygen and 20% carbon dioxide, by volume, in oxygen impermeable packaging material.

EXAMPLE 13

Demonstrating the antimicrobial effect of hop beta acids in fish.

Approximately 500 ppm in an acetone solution was added to approximately 2 grams of manually homogenized smelt tissue. A control smelt tissue was spiked with an equivalent amount of acetone only (approx. 200 mcl). The 20 ml glass vials containing these tissue preparations were capped and stored at ambient temperature for approximately 24 hours. Interestingly, the stored beta/smelt homogenate lacked the unpleasant spoiled, fishy odor that was overwhelmingly noticeable in the control tissue.

EXAMPLE 14

Demonstrating a convenient liquid formulation of hop beta acids and rosemary extract suitable for application to fresh meat, fish or poultry.

A liquid composition is prepared by combining from 5-49% by weight decaglycerol tetraoleate (Mazol® PGO 104k) with 25-55% lipophilic and/or hydrophilic rosemary extract, 5-40% hop extract containing hop beta acids, and 20-40% vegetable oil. The mixture can be heated to solubilize the components. The percentages of each ingredient depends upon the concentration of the active constituents in each extract, which vary according to the raw material from which they are produced, and can be adjusted by one skilled in the art to provide a composition which delivers effective amounts of the hop extract and rosemary components to the meat. Other, less preferred, solubilizers or diluents can be used to make this liquid composition. These include, benzyl alcohol, ethyl alcohol, polysorbate emulsifiers, sorbitans, fatty acid esters, and mono and diglycerides.

EXAMPLE 15

Demonstrating the use of rosemary extract and hop extract in combination with other flavorings. Coarse ground beef is treated with 0.1% of a mixture of rosemary extract and a hop extract such that the meat contains about 25 ppm carnosic acid and about 125 ppm hop beta acids. The meat is also treated with 0.02% celery extract in the form of Aquaresin® Celery and 0.04% black pepper extract in the form of Aquaresin® Black Pepper. The meat is re-ground through a ⅛" screen and packaged in oxygen impermeable packaging material under an 80% oxygen, 20% carbon dioxide atmosphere. Aquaresin® is a registered trademark of Kalsec®, Inc.

EXAMPLE 16

Demonstrating the use of purified constituents of Labiatae herb extract and hop extract in ground beef. Coarse ground beef is treated sequentially with an aqueous solution of hop beta acids at a pH of 12 and a solution of carnosic acid in ethanol such that the final concentration of hop beta acids in the meat upon addition is 60 ppm and the final concentration of carnosic acid in the meat upon addition is 15 ppm. The meat is re-ground through a ⅛" screen and packaged in oxygen impermeable packaging material under an 80% oxygen, 20% carbon dioxide atmosphere.

EXAMPLE 17

Demonstrating the preparation of a composition containing purified Labiatae herb acids and hop beta acids. One hundred grams of a composition useful for extending the color and bacterial shelf life of fresh meat, fish and poultry is prepared by combining 10 grams of hop beta acids and 15 grams of decaglycerol tetraoleate and heating the resulting mixture to about 50-80° C. Four grams of carnosic acid and 71 grams of vegetable oil is then added and the resulting mixture is heated to between 80-110° C. for about five minutes with stirring. A homogeneous liquid is formed. This liquid can be added at various doses to fresh meat, fish and poultry to provide shelf life extension.

Utilizing a procedure similar to that described above but substituting carnosol for carnosic acid, a homogeneous liquid containing carnosol and hop beta acids is obtained.

One hundred grams of a composition containing purified rosmarinic acid and hop beta acids is prepared by combining 10 grams of hop beta acids, 4 grams of rosmarinic acid and 86 grams of propylene glycol. The resulting mixture is heated to between 80-110° C. for about five minutes with stirring to yield a homogeneous liquid containing rosmarinic acid and hop beta acids.

It is shown that the combination of a hop extract containing an effective amount of beta acids and a rosemary or other Labiatae extract containing effective amounts of carnosic acid, carnosol, and/or rosmarinic acid have a synergistic effect on preserving the color and reducing both Gram positive and Gram negative bacterial growth in meat, fish and poultry packaged in an oxygen containing atmosphere, and preferably in an elevated oxygen atmosphere with the remainder of the gas being $CO_2$ or a mixture of $CO_2$ and $N_2$. These novel effects enable meat processors to provide MAP packaged meats of acceptable appearance and bacterial counts under commercially feasible distribution and display conditions, and thereby afford a new means of offering consumers meat, fish and poultry of superior quality and lower bacterial counts. Since the inhibitory combination of natural flavorings is not fed to animals from which red meats are derived, it does not run the risk of creating antibiotic resistant bacterial strains, which is an adverse effect of the use of antibiotics in animal feeds.

The results show that color retention is improved and bacterial growth diminished by the synergistic combination of an effective amount of hop extract containing beta acids and an effective amount of rosemary extract or other Labiatae herb extract containing carnosic acid, optionally carnosol, and optionally rosmarinic acid, or essentially rosmarinic acid, provided oxygen is present at 20% or more, and preferably 40% or more, and more preferably at 60% or more, and most preferably at 70-80% or above, and with $CO_2$ preferably consisting of the other gas, and less preferably a mixture of $CO_2$ and nitrogen. The invention also pertains to the masking of the hop extract flavor by the rosemary extract, which results in being able to use higher, and thus more effective amounts of hop extracts without causing negative flavor impacts.

It is to be understood that the invention is not to be limited to the exact details of operations, or to the exact compositions, methods, procedures, or embodiments shown and described, as obvious modifications and equivalents will be apparent to one skilled in the art, and the invention is therefore to be limited only by the full scope which can be legally accorded to the claims hereof.

What is claimed is:

1. A food selected from the group consisting of fresh meat, poultry and fish comprising a combination of a rosemary herb extract which is essentially free of the native essential oil and is an antioxidant which contains a rosemary herb acid selected from the group consisting of carnosic acid, carnosol and rosmarinic acid, and a hop extract containing beta acids, wherein the weight ratio of the beta acids to the rosemary herb acid present in the food is between about 0.5 and about 13, and wherein the hops beta acids are present in the food in an amount between 50-300 ppm.

2. The food according to claim 1, containing between 19 and 500 ppm of rosemary herb acid and between 50 and 300 ppm of beta acids.

3. A packaged food product comprising the food according to claim 1, wherein the food has been packaged by modified atmosphere packaging in an atmosphere comprising 20% or more oxygen and a mixture of carbon dioxide and nitrogen.

4. The packaged food product according to claim 3, wherein the atmosphere contains more than 40% oxygen.

5. The packaged food product according to claim 4, wherein the atmosphere contains more than 60% oxygen.

6. The packaged food product according to claim 5, wherein the atmosphere contains more than 70% oxygen.

7. The food according to claim 1, wherein the rosemary herb extract and hop extract containing beta acids are present in amounts that are effective in prolonging the color and microbiological stability of meat, poultry, or fish in an atmosphere comprising 20% or more of oxygen and optionally another gas selected from the group consisting of carbon dioxide and a mixture of carbon dioxide and nitrogen.

8. The food according to claim 7, wherein the atmosphere comprises 40% or more oxygen and optionally another gas selected from the group consisting of carbon dioxide and a mixture of carbon dioxide and nitrogen.

9. The food according to claim 8, wherein the atmosphere comprises 60% or more oxygen and optionally another gas selected from the group consisting of carbon dioxide and a mixture of carbon dioxide and nitrogen.

10. The food according to claim 9, wherein the atmosphere comprises 70% or more oxygen and optionally another gas selected from the group consisting of carbon dioxide and a mixture of carbon dioxide and nitrogen.

11. The food according to claim 1, wherein the rosemary herb extract and hop extract is in the form of a composition which additionally contains a carrier selected from the group consisting of decaglycerol monooleate, fatty acid esters, benzyl alcohol, ethyl alcohol, propylene glycol, vegetable oil, polysorbates, sorbitans, sorbitan trioleate, capric/caprylic triglycerides, dextrose and combinations thereof.

12. The food according to claim 11, wherein the composition additionally contains flavorings and adjuvants.

13. The food according to claim 11, wherein the composition contains from 5-49% by weight of a solubilizer or diluent selected from the group consisting of decaglycerol tetraoleate, benzyl alcohol, ethyl alcohol, propylene glycol, polysorbate emulsifiers, sorbitans, fatty acid esters, mono- and diglycerides, and mixtures thereof, 25-55% of a rosemary herb extract selected from the group consisting of lipophilic rosemary extract, hydrophobic rosemary extract and mixtures thereof, 5-40% hop extract containing hop beta acids and 20-40% vegetable oil.

14. The food according to claim 1, wherein the food is fresh ground meat.

15. A method for preparing the packaged food product according to claim 3, comprising applying to or incorporating into fresh meat, fish or poultry, a combination of a rosemary herb extract which is essentially free of the native essential oil and is an antioxidant which contains a rosemary herb acid selected from the group consisting of carnosic acid, carnosol and rosmarinic acid, and a hop extract containing beta acids, wherein the weight ration of the beta acids to the rosemary herb acid present in the food is between about 0.5 and about 13, and wherein the hops beta acids are present in the food in an amount between 50-300 ppm, and then packaging the fresh meat, fish or poultry in an atmosphere that contains 20% or more oxygen.

16. A method for extending the color life and inhibiting bacterial growth in the food product according to claim 3, comprising applying to or incorporating into fresh meat, fish or poultry a rosemary herb extract which is essentially free of the native essential oil and is an antioxidant which contains a rosemary herb acid selected from the group consisting of carnosic acid, carnosol, rosmarinic acid and mixtures thereof, and a hop extract containing beta acids wherein the weight ration of beta acids to the rosemary herb acid is between about 0.5 and 13, and wherein the hops beta acids are present in an amount between 50-300 ppm, and then packaging the fresh meat, fish or poultry in an atmosphere that contains 20% or more oxygen.

17. The method according to claim 16, wherein the rosemary herb extract and hop extract are applied to or incorporated into the fresh meat, fish or poultry in the form of a composition.

18. The method according to claim 16, wherein the rosemary herb extract and hop extract are applied to or incorporated into the fresh meat, fish or poultry separately.

19. The method according to claim 17, wherein the composition is applied to or incorporated into the fresh meat, fish or poultry by spraying, injecting, dipping, painting, vacuum tumbling, marinating, mixing, pumping, dispersion on a carrier and combinations thereof.

20. A method for blocking the bitter taste of a hop extract containing beta acids that has been applied to the food according to claim 1, comprising applying the hop extract in combination with a rosemary herb extract containing a rosemary herb acid selected from the group consisting of carnosic acid, carnosol, rosmarinic acid and mixtures thereof to meat, fish or poultry, wherein the rosemary herb extract is essentially free of the native essential oil and is an antioxidant, and wherein the weight ration of beta acids to rosemary herb acid is about 0.5 to about 13, and wherein the hops beta acids are present in an amount between 50-300 ppm.

21. A method of extending the microbial shelf life of the food product according to claim 3, comprising applying to or incorporating into fresh meat, fish or poultry a microbial shelf life extending amount of a rosemary herb extract which is essentially free of the native essential oil and is an antioxidant containing a rosemary herb acid selected from the group consisting of carnosic acid, carnosol, rosmarinic acid and mixtures thereof, and a hop extract containing beta acids, wherein the weight ratio of beta acids to rosemary herb acid is between about 0.5 and about 13, and wherein the hops beta acids are present an amount between 50-300 ppm, and then packaging the fresh meat, fish or poultry in an atmosphere that contains 20% or more oxygen.

22. A method of inhibiting the growth of bacteria in the food according to claim 1, comprising applying to or incorporating into fresh meat, fish or poultry a combination of a rosemary herb extract which is essentially free of the native essential oil and is an antioxidant containing a rosemary herb acid selected from the group consisting of carnosic acid, carnosol, rosmarinic acid and mixtures thereof, and a hop extract containing beta acids, wherein the weight ratio of beta acids to rosemary herb acid is about 0.5 to 13, and wherein the hops beta acids are present an amount between 50-300 ppm, and then subjecting the fresh meat, fish or poultry to modified atmospheric packaging.

23. The method according to claim 22, wherein the bacteria is a Gram-negative bacteria.

24. The method according to claim 23, wherein the Gram-negative bacteria is *Aeromonas hydrophilla*.

25. The method according to claim 23, wherein the Gram-negative bacteria is *Escherichia coli*.

26. The method according to claim 23, wherein the Gram-negative bacteria is *Serratia liquefaciens*.

\* \* \* \* \*